United States Patent
Jeong et al.

(10) Patent No.: US 7,595,858 B2
(45) Date of Patent: Sep. 29, 2009

(54) METHOD OF FABRICATING LIQUID CRYSTAL DISPLAY DEVICE INCLUDING MAIN EXPOSURE PROCESS AND EDGE EXPOSURE PROCESS

(75) Inventors: Chul Jeong, Gyungsangbuk-Do (KR); Dae-Jin Jeon, Gyungsangbuk-Do (KR); Hae-Jin Kim, Gyungsangnam-Do (KR)

(73) Assignee: LG Display Co., Ltd., Seoul (KR)

( * ) Notice: Subject to any disclaimer, the term of this patent is extended or adjusted under 35 U.S.C. 154(b) by 16 days.

(21) Appl. No.: 11/902,924

(22) Filed: Sep. 26, 2007

(65) Prior Publication Data
US 2008/0026301 A1    Jan. 31, 2008

Related U.S. Application Data

(62) Division of application No. 10/874,543, filed on Jun. 24, 2004, now Pat. No. 7,292,305.

(30) Foreign Application Priority Data
Jun. 30, 2003   (KR) .......................... 2003-0043986

(51) Int. Cl.
*G02F 1/13*   (2006.01)
*G02F 1/1335*   (2006.01)
*G02F 1/1333*   (2006.01)
*G03F 5/00*   (2006.01)

(52) U.S. Cl. .................. 349/187; 349/106; 349/110; 430/319; 430/321; 430/394

(58) Field of Classification Search ............... 349/106, 349/110, 187; 430/319, 321, 394
See application file for complete search history.

(56) References Cited

U.S. PATENT DOCUMENTS

| | | | |
|---|---|---|---|
| 6,145,981 A * | 11/2000 | Akahira et al. | 347/107 |
| 6,429,057 B1 * | 8/2002 | Hong et al. | 438/158 |
| 2002/0030769 A1 * | 3/2002 | Bae | 349/43 |

FOREIGN PATENT DOCUMENTS

| | | |
|---|---|---|
| KR | 10-2001-0062359 | 7/2001 |
| KR | 10-2005-0003270 | 1/2005 |

* cited by examiner

*Primary Examiner*—Michael H Caley
(74) *Attorney, Agent, or Firm*—McKenna Long & Aldridge (57) ABSTRACT

A method of fabricating a LCD device comprises preparing a substrate having a plurality of LCD panel regions within main exposure regions, performing a main exposure process at the LCD panel regions to define a non-exposure region between the main exposure regions; and performing a sub exposure process at the non-exposure region formed between the main exposure regions.

13 Claims, 7 Drawing Sheets

METHOD OF FABRICATING LIQUID CRYSTAL DISPLAY DEVICE INCLUDING MAIN EXPOSURE PROCESS AND EDGE EXPOSURE PROCESS

This application is a Divisional of prior application Ser. No. 10/874,543, filed Jun. 24, 2004, now U.S. Pat. No. 7,292,305 which claims the benefit of Korean Patent Application No. 2003-0043986 filed in Korea on Jun. 30, 2003, which is hereby incorporated by reference in its entirety as if fully set forth herein.

BACKGROUND OF THE INVENTION

1. Field of the Invention

The present invention relates to a method of fabricating a liquid crystal display (LCD) device, and more particularly, to a method of fabricating an LCD device capable of exposing a non-exposure region.

2. Description of the Related Art

Recently, LCD devices using a thin film transistor as a switching device have been widely utilized as image displaying devices. These LCD devices can be installed in various display devices such as a notebook, a personal digital assistant, a TV, etc. In order to increase productivity of LCD devices, manufacturers generally form a large number of unit LCD panels on a large mother substrate. However, the trend for these devices is to become larger, which decreases the number that can be formed on a substrate.

The process of forming a plurality of LCD panels on the mother substrate will be explained in brief. The method of fabricating the LCD device mainly includes the steps of forming a thin film transistor (TFT) array substrate having a switching device, forming a color filter substrate for displaying images in colors, bonding the TFT array substrate and the color filter substrate, and injecting liquid crystal between the two substrates.

The step of forming the TFT array substrate further includes the steps of preparing a mother substrate, defining a plurality of LCD panel regions on the mother substrate, forming a switching device on the LCD panel region, and forming an alignment layer on the mother substrate for the initial alignment of liquid crystal.

The step of forming the color filter substrate further includes the steps of preparing a mother substrate, defining a plurality of LCD panel regions on the mother substrate, forming a color filter layer on the LCD panel region, forming a common electrode on the color filter layer, and forming an alignment layer on the common electrode.

Figure 1:
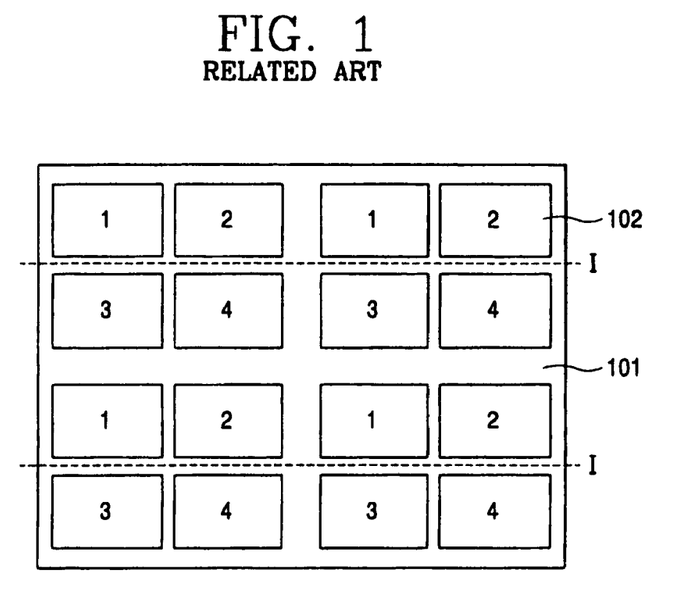
FIG. 1 is a plane view of a substrate where a plurality of unit liquid crystal panel regions are formed according to the related art.

The step of forming a plurality of the LCD panels on the mother substrate will be explained in more detail with reference to FIG. 1. FIG. 1 is a plane view showing a substrate where a plurality of unit liquid crystal panel regions are formed according to the related art. As shown in FIG. 1, there are 16 unit LCD panel regions 102 formed on a mother substrate 101. After the LCD panel regions 102 are defined, a metal layer is deposited on the entire mother substrate 101 by a sputtering process in order to form a gate electrode. Then, a photoresist is applied on the metal layer and an exposure process is performed in order to pattern the metal layer to form the gate electrode. Since the mother substrate 101 is not entirely exposed to light by one time exposure process due to the size limitation of the mask and exposing device, the exposing process must be repeatedly performed.

Figure 2:
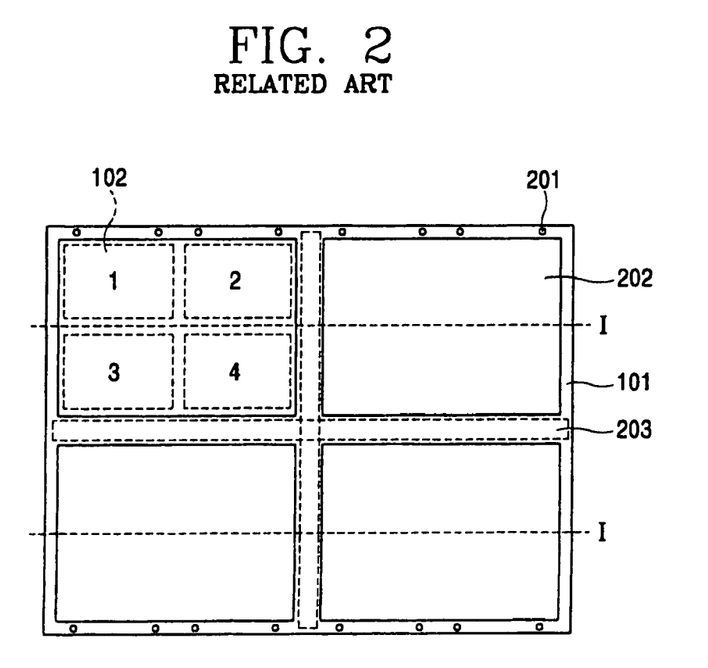
FIG. 2 is a plane view of a plurality of exposure regions formed on the substrate of FIG. 1.

FIG. 2 is a plane view showing a plurality of exposure regions formed on the substrate of FIG. 1. First, the mother substrate 101 is transferred onto a stage where an exposing device (not shown) is installed. Then, the exposing device detects an alignment key 201 formed at the edge of the mother substrate 101 to precisely arrange the mother substrate 101 onto the stage.

The alignment key 201 serves as a reference for arranging the unit LCD panels in order to efficiently utilize space when different LCD panels are simultaneously formed on the same mother substrate 101, and to apply the same mask at the time of performing the exposure process. In an exposure region 202 that can be exposed once by the exposure process, the LCD panel regions 102 are symmetrically arranged right and left on the basis of an exposure center line I. FIG. 2 illustrates that four LCD panel regions 102 are symmetrically arranged on the unit exposure region 202 based on the exposure center line I.

As shown in FIG. 2, if a size of the mother substrate 101 is not an integer times of a size of the unit LCD panel region 202, a non-exposure region 203 is formed at the center of the mother substrate 101 at the time of performing the exposure process since the unit LCD panel region 102 is arranged on the basis of the alignment key 201.

Since a photoresist applied to the non-exposure region 203 is not exposed, the photoresist is thicker than that in the LCD panel region 102 after a development process. Due to the photoresist pattern, it is difficult to determine an etching rate and to detect an end point of the etching. The non-exposure region 203 requires processing at the time of fabricating a color filter substrate, thereby causing a mis-alignment when the upper and lower substrates are bonded to each other.

The width of the photoresist pattern remaining at the non-exposure region 203 is much greater than that of the photoresist pattern at the LCD panel region 102, and therefore, it is very difficult to determine a proper etching time when a dry etch is performed. In addition, since a removing rate of the photoresist pattern of the LCD panel region 102 is different from that of the photoresist pattern of the non-exposure region 203 at the time of a stripping process of the photoresist pattern, the LCD panel region 102 may be damaged.

Also, a uniform etching rate is not determined due to the photoresist pattern of the non-exposure region 203 at the time of the dry etch. Thus, detecting the end point of the etching is difficult.

The inferiority generated at the time of exposing the TFT array substrate is also generated at the time of fabricating the color filter substrate. Specifically, the non-exposure region 203 is formed at the center of the mother substrate 101 if the unit LCD panel region 102 is defined on the mother substrate 101, then the color filter is deposited on the entire mother substrate 101 arranged on the basis of the alignment key 201, and the exposure process is performed.

Since a negative type photoresist is mainly used to form the color filter substrate, the photoresist is completely removed in the non-exposure region of the color filter substrate. Accordingly, a severe step is generated at the time of fabricating the color filter substrate, thus causing a cell gap inferiority at the time bonding the color filter substrate to the TFT array substrate.

SUMMARY OF THE INVENTION

Accordingly, the present invention is directed to a method of fabricating an LCD device capable of exposing a non-exposure region formed at the center of a mother substrate, which method substantially obviates one or more problems due to limitations and disadvantages of the related art.

An object of the present invention is to provide a method of fabricating an LCD device capable of improving a rubbing inferiority, a cell gap inferiority, and etc. due to a non-exposure region formed at the center of a mother substrate generated when an exposure process is performed in order to form a plurality of LCD panels at the mother substrate by forming a photoresist pattern of a stripe type at the non-exposure region using an edge exposure device including a slit mask.

Another object of the present invention is to perform a uniform etching of the entire substrate by forming a predetermined photoresist pattern using an edge exposing device at a non-exposure region formed at the center of the substrate generated due to a limitation of an exposing device when a plurality of LCD panel regions are defined and a plurality LCD panels are formed on a large substrate.

To achieve these and other advantages and in accordance with the purpose of the present invention, as embodied and broadly described herein, there is provided a method of fabricating an LCD device including preparing a substrate having a plurality of LCD panel regions within main exposure regions, performing a main exposure process at the LCD panel regions to define a non-exposure region between the main exposure regions, and performing a sub exposure process at the non-exposure region.

In another aspect, a method of fabricating an LCD device includes preparing a substrate having a plurality of LCD panel regions within main exposure regions, forming a metal layer on the substrate, forming a photoresist on the metal layer, performing a main exposure process on the photoresist to define a non-exposure region between the main exposure regions, performing a sub exposure process at the non-exposure region using an edge exposing device where a mask having a predetermined pattern is mounted, etching the metal layer to form a gate electrode, forming an active layer on the gate electrode, forming source and drain electrodes on the active layer, forming a passivation layer on the source and drain electrodes, and forming a pixel electrode on the passivation layer.

In another aspect, a method of fabricating an LCD device includes preparing a substrate having a plurality of LCD panel regions within main exposure regions, forming a black matrix on the substrate, performing a main exposure process at the LCD panel regions to define a non-exposure region between the main exposure regions; performing a sub exposure process at the non-exposure region, performing a main exposure process on the LCD panel regions, performing an edge exposure process on the non-exposure region to form a color filter layer, and forming an alignment layer on the color filter layer.

In another aspect, a method of fabricating an LCD device includes performing a main exposure process at a plurality of LCD panel region within main exposure regions using a mask including a predetermined pattern, and performing a sub exposure process at a non-exposure region formed between the main exposure regions using an edge exposing device having a slit mask of a predetermined pattern.

In another aspect, a method of fabricating an LCD device includes preparing a substrate having a plurality of LCD panel regions, performing a main exposure process at the LCD panel regions and generating a non-exposure region at a center of the substrate, and performing a sub exposure process at the non-exposure region.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
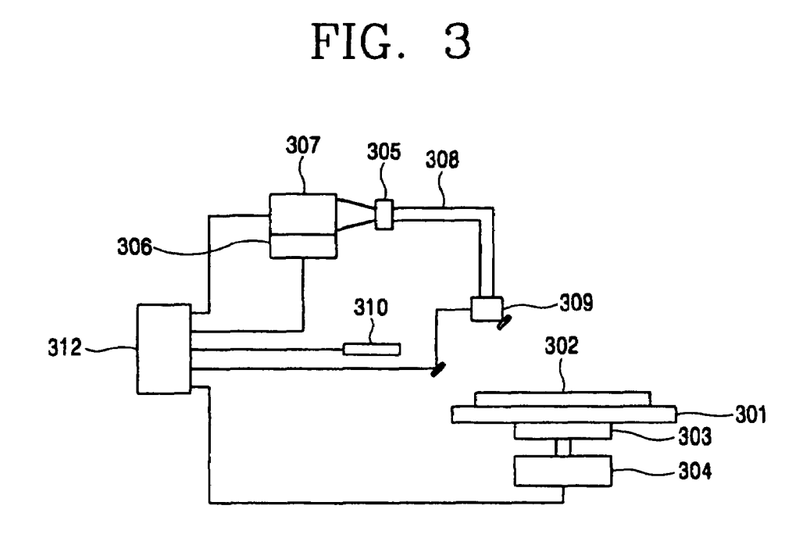
FIG. 3 is a schematic view showing an edge exposing device according to the present invention.

Hereinafter, an edge exposing device used to fabricate an LCD device of the present invention will be explained with reference to FIG. 3. As shown in FIG. 3, the edge exposing device includes a stage 303 loading a substrate 301 where a photoresist 302 is deposited, a stage driving unit 304 for moving the stage 303, an optical source unit 307, a shutter 305 for shielding light irradiated from the optical source unit 307 and a shutter driving unit 306, a nozzle 309 for irradiating ultraviolet rays provided from the optical source unit 307 through the shutter 305 and an optical source fiber 308 onto the substrate 301, a nozzle driving unit 310 for driving the nozzle 309, a position detector (not shown) integrally treated with the nozzle 309 for detecting a substrate exposure region, and a controller 312 for controlling a system. The nozzle 309 is provided with a slit mask where a pattern to be transferred onto the substrate 301 is formed. In the edge exposing device of the present invention, since light irradiated onto the substrate 301 passes through the slit mask, light for exposing is processed as a predetermined pattern thus to be irradiated onto the substrate 301.

Figure 4:
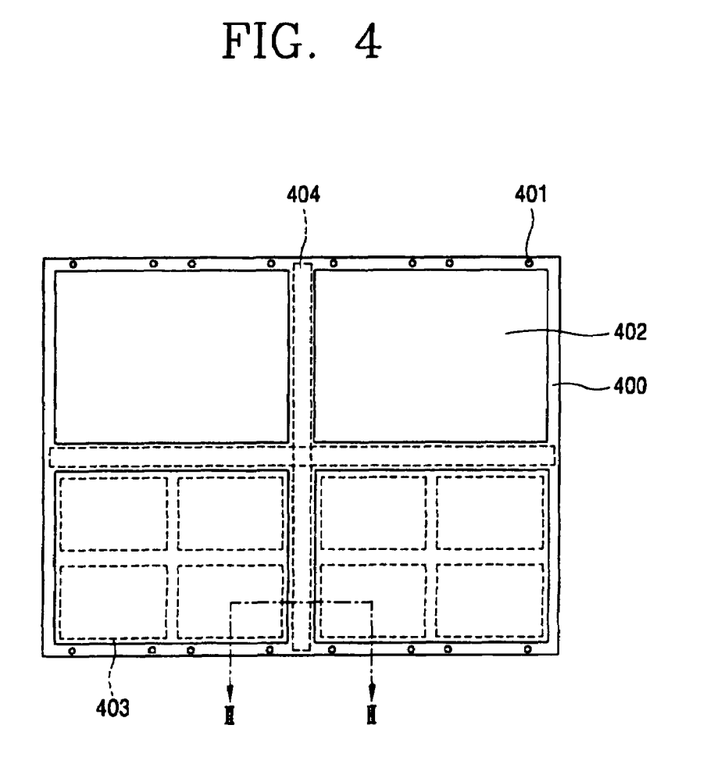
FIG. 4 is a plane view of the substrate showing a main exposure region and a non-exposure region according to the present invention.

The method of fabricating an LCD device using the edge exposing device will be explained with reference to FIGS. 4 and 5. FIG. 4 illustrates a mother substrate 400 where a plurality of unit LCD panel regions 403 are formed. Also, a plurality of alignment keys 401 are formed at the edge of the mother substrate 400, for position detection so that the substrate 400 can be precisely arranged at a stage when the substrate 400 is loaded at the exposing device. Further, the alignment keys 401 are spaced from the edge of the substrate 400 by approximately 6 mm.

A plurality of exposure regions 402 that can be exposed to light by one time main exposure process are formed on the mother substrate 400. The size of the unit exposure region 402 may be different according to the kind of device used. In the preferred embodiment, four LCD panel regions 403 are exposed to light by the one time exposure process. The LCD panel regions 403 inside the unit exposure region 402 are symmetrically arranged right and left on the basis of the exposure center line.

The alignment keys 401 are formed at the edge of the mother substrate 400 in order to effectively arrange the formed LCD panel regions 403 and to maximize the area efficiency of the mother substrate 400 and apply the same mask, and therefore, LCD panels having different sizes may be formed on one mother substrate. However, if the size of the mother substrate 400 is not the integer times of the unit panel size, a non-exposure region 404 is generated at the center of the mother substrate 400.

The method of fabricating an LCD device according to the present invention includes a step of exposing the non-exposure region 404 by the edge exposing device. The step of exposing the non-exposure region 404 is performed by applying a mask of a stripe type and thereby forming a pattern of the stripe type on the non-exposure region 404. The pattern of the slit mask may be shaped as the teeth of a comb, a net and the like. The step of exposing the non-exposure region 404 may be applied to the TFT array substrate fabricating method and the color filter substrate fabricating method.

Hereinafter, the process of fabricating the TFT array substrate will be explained with reference to FIGS. 5A to 5I. FIGS. 5A to 5I are cross-sectional views taken along II-II of FIG. 4 to illustrate that a non-exposure region is positioned at the center of a substrate and LCD panel regions having a plurality of TFTs as a switching device are arranged at the right and left sides of the non-exposure region.

Figure 5A:
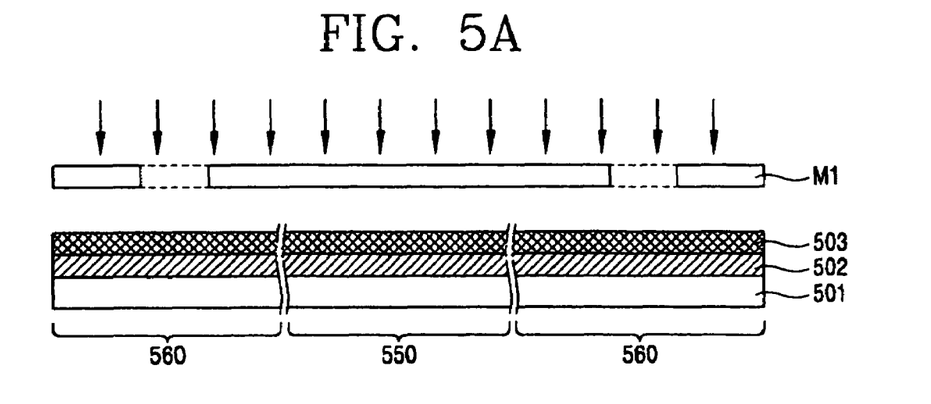
FIGS. 5A to 5I are cross-sectional views illustrating a fabrication process of a TFT array substrate according to the present invention.
Figure 5B:
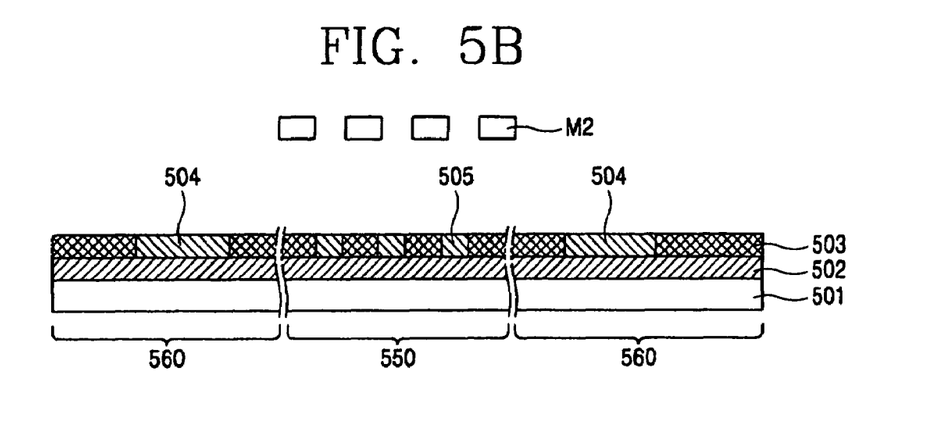

As shown in FIG. 5A, a gate metal 502 as a gate electrode is formed on the entire surface of a substrate 501 by a puttering process. The gate metal 502 is formed by depositing an aluminum alloy and Mo. After that, a photoresist 503 is deposited on the gate metal 502 in order to pattern the gate metal by a photolithography process. In the preferred embodiment, a positive type photoresist where an exposed part is removed by light for exposing in a development process is used for forming the gate electrode.

After the photoresist 503 is deposited on the gate metal 502, a main exposure process is performed at the unit exposure region where the LCD panel region is formed by a mask M1 including a gate electrode pattern and a main exposing device (not shown). The main exposing device may be a step stepper using a step and repeat method, or a scan stepper using a step and scan method. The scan stepper has a fast exposing speed, whereas the step stepper has a minute exposure process. It is efficient to use the scan stepper to fabricate a large unit cell and to use the step stepper to fabricate a small unit cell.

Referring back to FIG. 4, exposure processes of four times are performed at the four unit exposure regions 402 formed on one mother substrate 400, thereby exposing all the LCD panel regions 403 formed on the mother substrate 400.

FIG. 5A illustrates an exposure process by the main exposing device is performed at an LCD panel region 560 of a mother substrate 501 through the mask M1 mounted at the main exposing device and not performed at the non-exposure region 550 formed at the center of the substrate 501. After the unit exposure region is exposed through the main exposing device, the non-exposure region 550 formed at the center of the mother substrate is exposed.

The non-exposure region 550 is exposed by an edge exposing device used to remove a pile of photoresist excessively formed at the edge of the mother substrate 501 as foreign material. Thus, the photoresist of the non-exposure region 550 can be effectively patterned by the edge exposing device. In the edge exposing device of the present invention, a slit mask having a plurality of slits is mounted at the non-exposure region 550 in order to form an exposure pattern as a stripe type. The slit interval of the slit mask used in the preferred embodiment of the present invention may be 70 mm. The slit mask that can arbitrarily control the slit interval is thus used to perform an exposure by forming the slit interval of 40 mm. As the result, in the non-exposure region 550 formed on the center of the substrate 501, a photoresist pattern of the stripe type is formed by the edge exposing device applying the slit mask.

The reason why the photoresist of the non-exposure region 550 is formed as the stripe type is in order to make the gate metal layer 502 formed at the non-exposure region 550 partially remain. If the photoresist formed at the non-exposure region 550 is completely removed and the gate metal 502 formed therebelow is completely removed, a severe step is generated between the exposure region 560 and the non-exposure region 550, thereby causing inferiority in the thin film forming process or the rubbing process to be performed later. If the photoresist of the non-exposure region 550 remains as it is without entirely exposing the non-exposure region 550, the gate metal 502 of the non-exposure region 550 is integrated with the photoresist. Accordingly, it is difficult to detect an etching point at the time of a dry etching, thereby causing an excessive etching and insufficient etching.

The process of exposing a substrate using the edge exposing device will be explained in more detail. First, the stage on which the substrate is loaded is moved towards a perpendicular direction to the exposure direction, and one direction of the non-exposure region formed at the center of the substrate as a cross shape is exposed. After one side of the non-exposure region of the cross shape is exposed, the substrate stage is rotated with 90° thereby to expose another side of the non-exposure region of the cross shape.

After the LCD panel region is exposed by the main exposing device and the non-exposure region is exposed by the edge exposing device, a development process for removing the exposed photoresist is performed. As the result, a photoresist pattern of the gate electrode is formed at the LCD panel region and a photoresist pattern of the stripe type is formed at the center of the substrate.

Figure 5C:
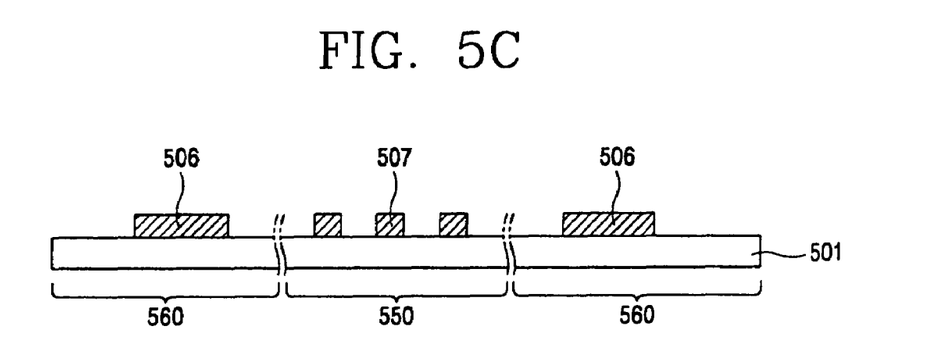

Then, the photoresist pattern formed at the LCD panel region and the photoresist pattern of the stripe type formed at the non-exposure region are applied as a mask thus to perform an etching of the gate metal layer. As the result, as shown in FIG. 5C, a gate electrode 506 is formed on the exposure region 560, and a metal pattern 507 of the stripe type is formed on the non-exposure region 550.

Figure 5D:
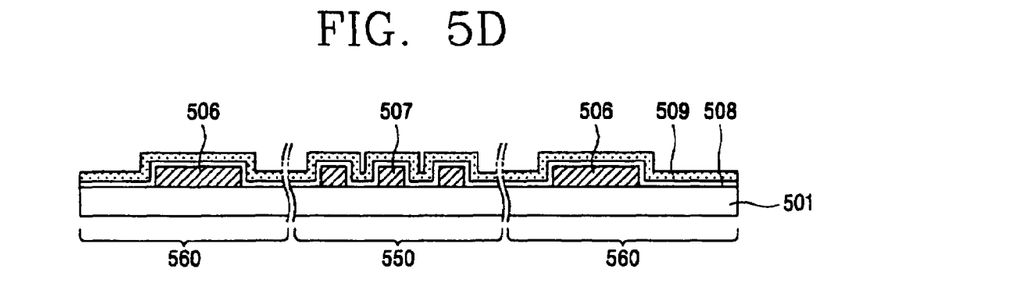

Then, as shown in FIG. 5D, a gate insulating layer 508, which may be a silicon nitride layer or a silicon oxidation layer, is formed on the entire surface of the mother substrate 501. Then, a semiconductor layer 509 is formed on the gate insulating layer 508. The semiconductor layer 509 may include an ohmic contact layer of an amorphous silicon layer or a high-concentration impurity layer which is to be used as an active layer of a thin film transistor. Also, the semiconductor layer 509 may be formed by a plasma CVD process.

Figure 5E:
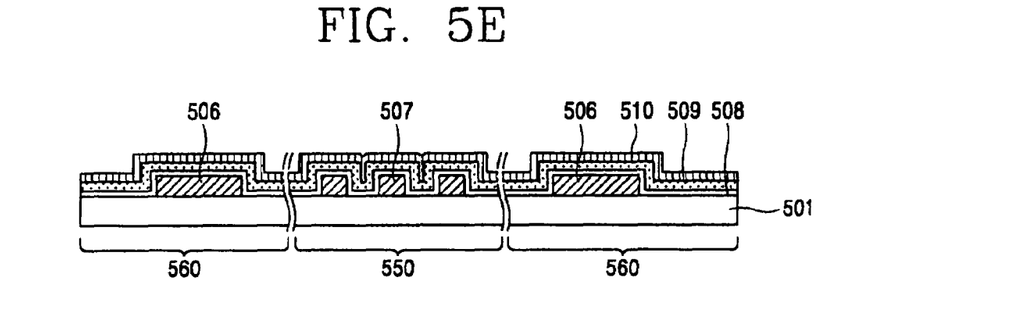

In FIG. 5E, a second photoresist 510 is formed on the semiconductor layer 509 in order to pattern the semiconductor layer 509 as an active layer. Then, a main exposure process is performed at the unit exposure region where the LCD panel region 560 is formed, and an edge exposure is performed at the non-exposure region 550 of the substrate.

Figure 5F:
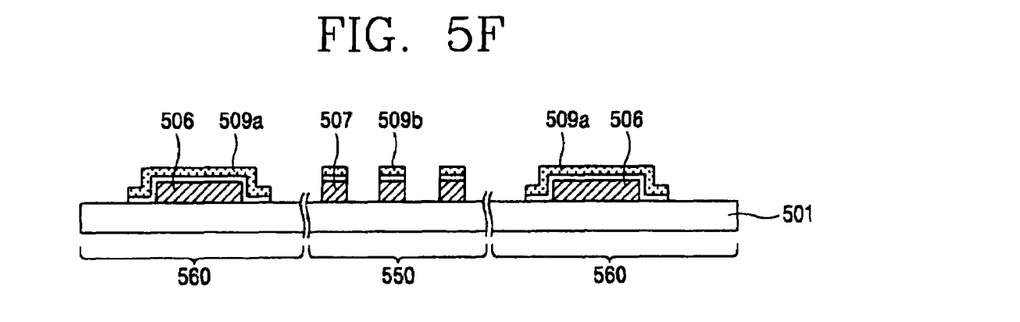

After that, as shown in FIG. 5F, a photolithography process is performed to form an active layer 509a on the LCD panel region 560 and to maintain the metal pattern 507 of the stripe type on which a semiconductor layer 509b is stacked at the non-exposure region 550. Since the semiconductor layer 509b on the metal pattern 507 is not necessarily required, it can be removed. However, the semiconductor layer 509b may not be removed for the process reduction.

Figure 5G:
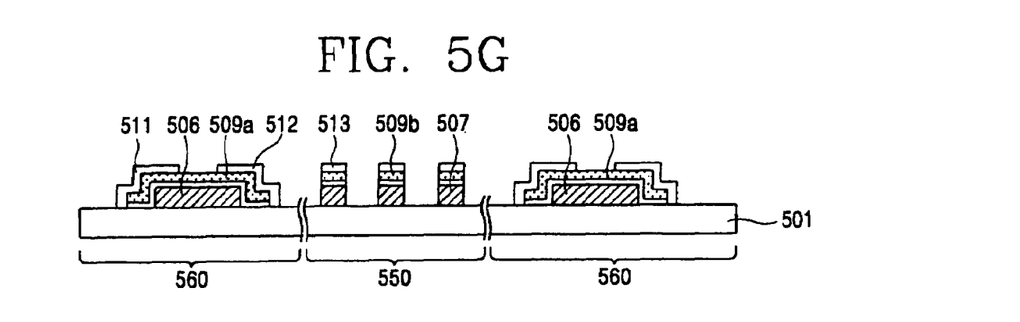

As shown in FIG. 5G, after the active layer 509a is formed, source and drain electrodes 511, 512 are formed on the LCD panel region 560. Specifically, a conductive layer 513 is formed on the substrate 501 where the active layer 509a is formed, and a photolithography process is performed to form the source and drain electrodes 511, 512. In the exposure step during the photolithography process, a main exposure process is performed at the LCD panel region 560 and an edge exposure process is performed at the non-exposure region. The conductive layer 513 on the gate metal pattern 507 of the stripe type may be removed.

Figure 5H:
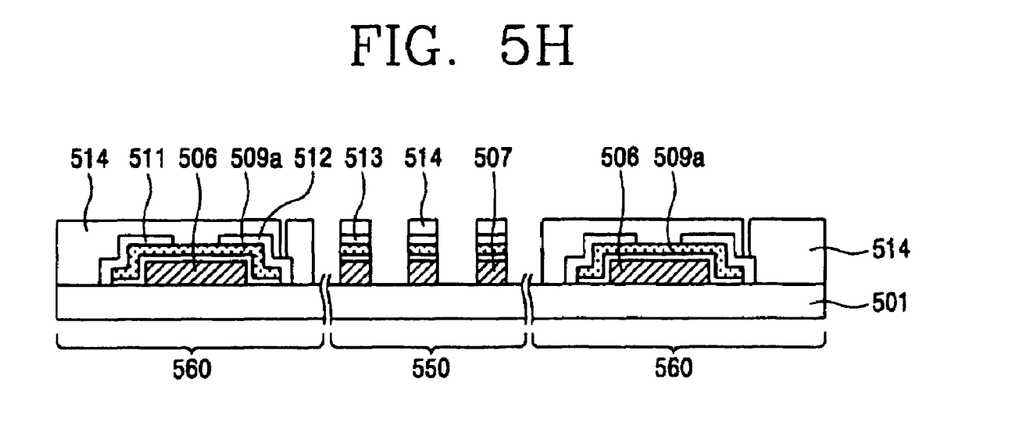

As shown in FIG. 5H, after the source and drain electrodes 511, 512 are formed, a passivation layer 514 is formed on the entire surface of the substrate 501. Then, a fourth photoresist (not shown) is formed, a main exposure process is performed at the LCD panel region 560, an edge exposure process is performed at the non-exposure region 550, the photoresist is developed, the passivation layer 514 is etched, and a cleaning process is performed, thereby forming a contact hole on the drain electrode 512.

Figure 5I:
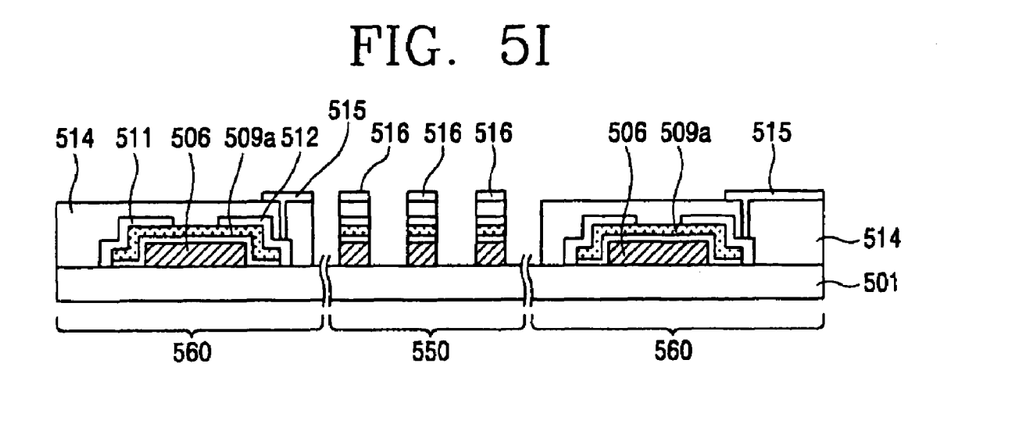

A transparent electrode of an indium tin oxide (ITO) or an indium zinc oxide (IZO) is formed on the passivation layer 514 in order to form a pixel electrode, and a fifth photoresist (not shown) is deposited. Then, a photolithography process including a main exposure process and an edge exposure process is performed, thereby forming a pixel electrode pattern 516. The pixel electrode pattern 516 is finally formed on the gate metal 507 of the non-exposure region 550. Although not shown, it is possible to further form a polyimide based alignment layer for the initial alignment of liquid crystal after forming the pixel electrode. Also, a rubbing process is performed at the alignment layer in order to determine the initial alignment direction of liquid crystal.

In the above description, the process of forming the TFT array substrate uses five masks. However, the present invention is not limited to this and can be applied even when an arbitrary mask process is used.

Hereinafter, a process of forming the color filter substrate according to the present invention will be explained with reference to FIGS. 6A to 6F. The process includes the steps of preparing a substrate, defining a plurality of LCD panel regions onto the mother substrate, forming a color filter layer on the entire substrate, forming a photoresist on the color filter layer, and performing an edge exposure process at the unit cell region of the substrate and at the non-exposure region formed at the center of the substrate.

Figure 6A:
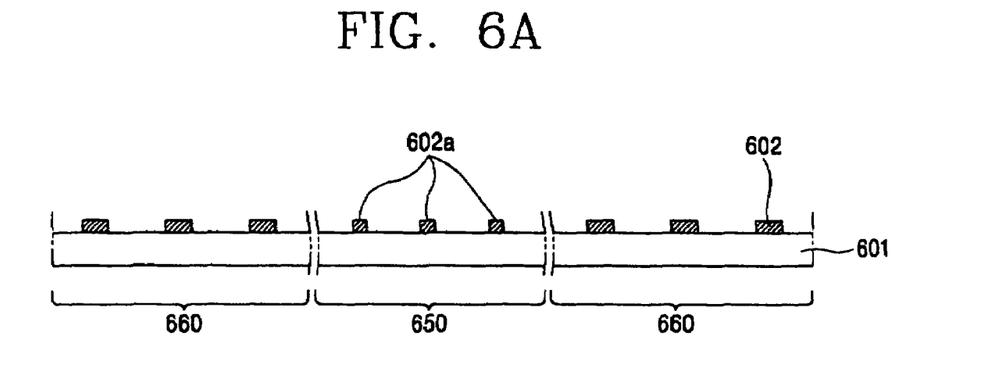
FIGS. 6A to 6F are cross-sectional views illustrating a fabrication process of a color filter substrate according to the present invention.

In FIG. 6A, a black matrix 602 for shielding unnecessary light among light irradiated from the TFT array substrate is formed on a transparent mother substrate 601. Generally, the black matrix 602 is formed between sub color filters of R, G, and B thus to shield light that passes through a reverse tilt domain formed at an edge portion of a pixel electrode of the TFT array substrate.

The black matrix 602 may be made of a metal thin film such as Cr having an optical density more than 3.5, an organic material such as carbon, or a double layer such as Cr/CrOx for a low reflection. Therefore, a proper material of the black matrix 602 is selected according to the purpose for which it is used.

The black matrix 602 is formed by a photolithography process. A Cr thin film or a carbon layer for forming the black matrix is deposited on the entire surface of the substrate 601, then a photoresist (not shown) is deposited thereon, and an exposure process is performed. The exposure process is separately performed at a unit liquid crystal cell region 660 and at a non-exposure region 650 formed at the center of the substrate 601. Like the exposure process of the TFT array substrate, a main exposure process using a main exposing device is performed at the LCD panel region 660, and an edge exposure process using an edge exposing device is performed at the non-exposure region 650. As the result, the black matrix 602 is formed at the LCD panel region 660, and a Cr layer or an organic layer pattern 602a of a stripe type is formed at the non-exposure region 650. The exposing process is performed in the same manner as that performed for forming the TFT array substrate.

Figure 6B:
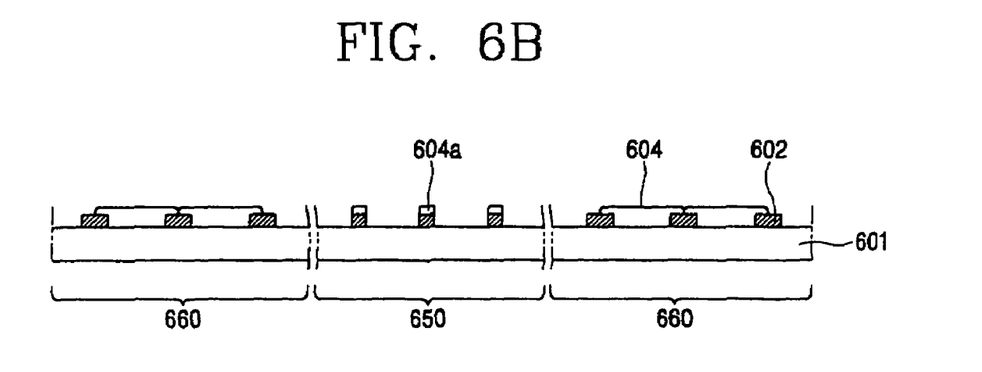

After the black matrix 602 is formed, the step of forming the color filter is performed as shown in FIG. 6B. The color filter can be fabricated by using one of several methods such as a dyeing method, an electrodepositing method, a pigment dispersing method, a printing method, etc. FIG. 6B illustrates the step of fabricating the color filter by the pigment dispersing method using color resins of R, G, and B.

First, one of the R, G, and B color resins is deposited on the entire surface of the substrate 601, and a selective exposure process is performed to form a red sub color filter layer 604 at a desired region. Then, a green color resin is deposited on the substrate 601 having the red sub color filter layer 604, and a selective exposure process is performed to form a green sub color filter layer. Further, a blue color resin is deposited and selectively exposed thereby to form a blue color filter layer. A color resin used to form a color filter layer is a generally negative photoresist, and an exposed part of the color resin to light during the exposure process is not removed during a development process.

The step of forming the R, G, and B color filter layers includes the steps of forming an arbitrary color resin among R, G, and B colors on the entire substrate 601; and performing the main exposure process at the LCD panel region 660 and performing the edge exposure process at the non-exposure region 650. The main exposure process and the edge exposure process are repeated for each R, G, and B color resin thus to form the three color filter layers.

In the conventional step of forming a color filter layer, since the exposure process is not performed at the non-exposure region formed at the center of the substrate, a color resin of the non-exposure region is completely removed after the development process thus to have a problem in controlling a cell gap. However, in the present invention, a color resin of the stripe type remains in the non-exposure region by the edge exposing device thus to enhance a cell gap maintaining characteristic.

When a color filter substrate is formed by the pigment dispersing method, R, G, and B color filter layers can be formed on the Cr layer or an organic layer formed at the non-exposure region. Herein, only one layer among the R, G, and B color filter layers can be formed with consideration of the cell gap characteristic. That is, if the color filter layer is formed in the order of R, G, and B, the exposure process is performed three times and an edge exposure process using the edge exposing device is performed one time in the non-exposure region. For example, when the R and G color filter layers are formed, the non-exposure region is not exposed thus to remove the color filter layer of the non-exposure region, and an exposure process using the edge exposing device is performed at the non-exposure region at the time of forming the final B color filter layer thereby to form a color filter layer pattern at the non-exposure region.

Figure 6C:
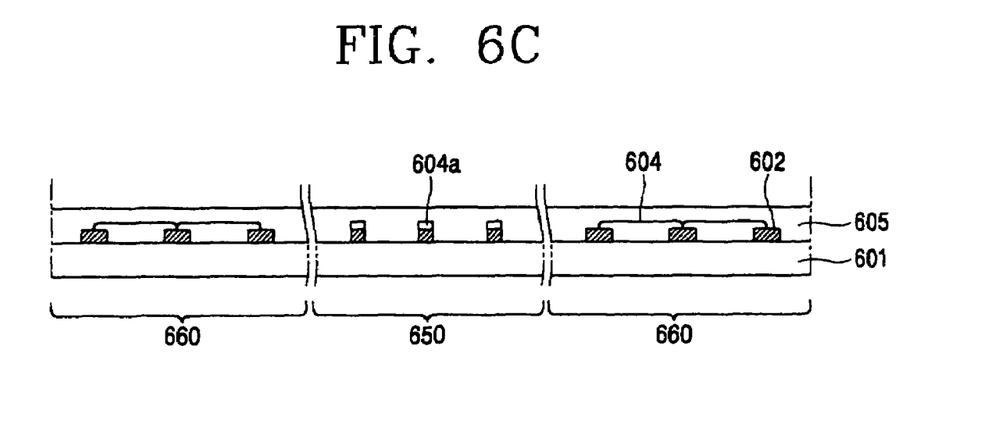

After the color filter is formed, as shown in FIG. 6C, a overcoat layer 605 is deposited on the substrate 601 where the color filter is formed. The overcoat layer 605 is not necessarily required and may be omitted in some situations. If a Cr-based metal is used as the black matrix 602, the thickness of the black matrix 602 may be as low as several thousands of Å. Thus, an overcoat forming process is not required. On the other hand, if a resin-based material is used for the black matrix 602, the height of the black matrix 602 may be as high as 1~1.5 μm, and an overcoat forming process is necessary.

Figure 6D:
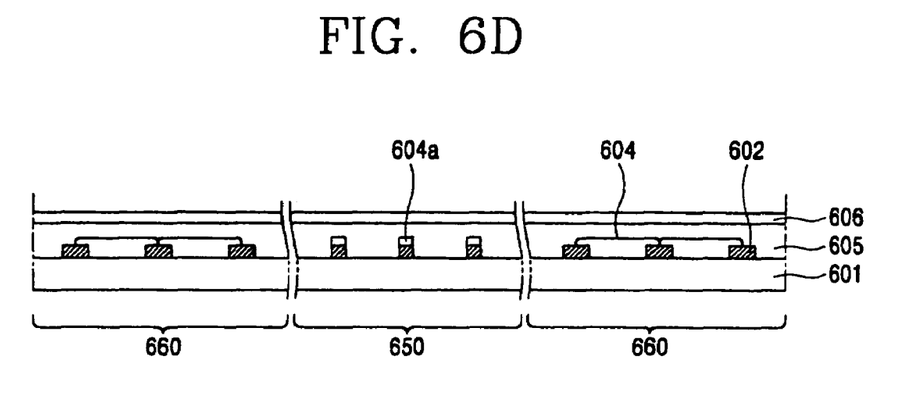

FIG. 6D illustrates a step of forming a common electrode 606 on the overcoat layer 605. As shown in FIG. 6D, the common electrode 606 may be a transparent electrode and mainly includes an indium tin oxide (ITO) layer. Also, the common electrode 606 drives liquid crystal with a common voltage applied thereto and a pixel voltage applied to a pixel electrode on the array substrate.

Figure 6E:
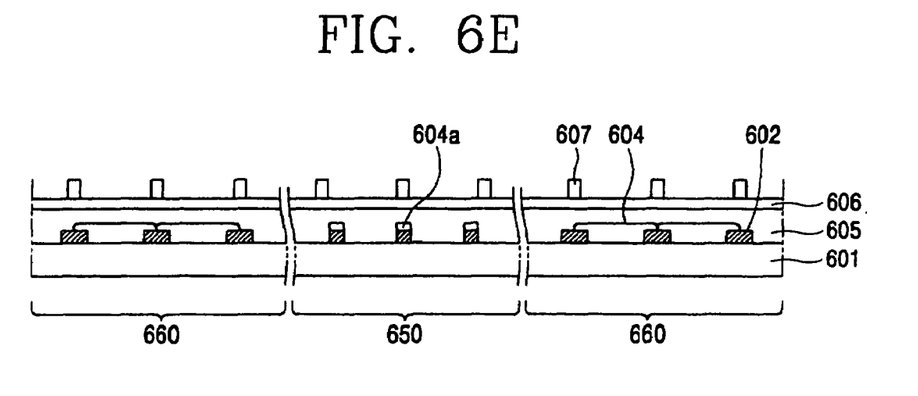

FIG. 6E illustrates a step of forming a plurality of column spacers 607 on the common electrode 606. A transparent organic layer is formed on the substrate 601 where the common electrode 607 is formed, and a photoresist is patterned by a photo mask process, thereby forming the column spacers 607 having a controlled shape and size at a predetermined position. The spacers 607 are formed on the entire substrate 601. Since a pattern of the stripe type is formed at the non-exposure region 650, a proper amount of spacers 607 are formed at the non-exposure region 650 thus to maintain a cell gap during the bonding process.

Figure 6F:
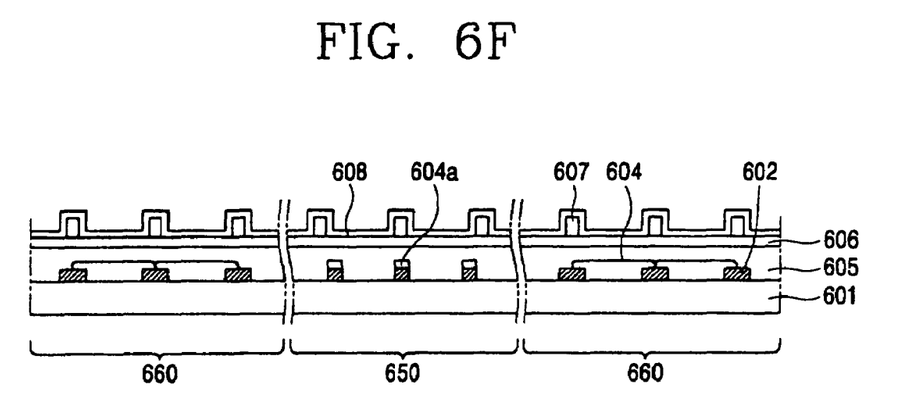

FIG. 6F illustrates a step of forming an alignment layer 608 to cover the spaces 607. An organic insulating layer such as polyimide is deposited on the color filter substrate 601 to form the alignment layer 608. Then, a rubbing process for forming a certain groove in order to determine the initial alignment direction is performed on the alignment layer 608, thereby completing the upper color filter substrate 601 of the LCD device.

Finally, the TFT array substrate and the color filter substrate are bonded to each other, and the liquid crystal is contained between the two substrates to thus complete an LCD panel of the LCD device.

In the present invention, a large substrate is used to simultaneously fabricate a plurality of LCD devices, and the non-exposure region formed at the center of the substrate is exposed by using the edge exposing device. Accordingly, the generation of particles is reduced at the time of a rubbing process, an end point detecting efficiency is increased at the time of a dry etching, a cell gap is maintained at the time of an bonding process, thereby fabricating an LCD device having good quality.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of fabricating an LCD device comprising:
    preparing a substrate having a plurality of LCD panel regions within main exposure regions and a non-exposure region;
    forming a layer for a black matrix on the substrate;
    forming a photoresist film on the layer;
    separately exposing the photoresist film at the LCD regions and the non-exposure region, wherein the photoresist film at the LCD regions is exposed by using a main exposure process, and the photoresist film at the non-exposure region is exposed by using an edge exposure process to form a photoresist pattern;
    patterning the layer by using the photoresist pattern as a mask to form a black matrix and a pattern on the substrate;
    removing the photoresist pattern;
    forming color filter layers and a resin pattern on the substrate, wherein the color filter layers are formed at the LCD regions of the substrate by using a main exposure process, and the resin pattern is formed on the pattern of the non-exposure region by using an edge exposure process;
    forming a common electrode on the substrate including the color filter layers and the resin pattern;
    forming a plurality of column spacers on the common electrode; and
    forming an alignment layer over the spacers and common electrode.

2. The method of claim 1, wherein the edge exposure process is performed by an edge exposing device having a slit mask in the performing the edge exposure process.

3. The method of claim 1, wherein forming the color filter layer includes forming R, G, and B sub color filter layers at the LCD panel regions.

4. The method of claim 3, wherein the edge exposure process is performed at the non-exposure region in one step during the forming of the sub color filter layers.

5. The method of claim 4, wherein the edge exposure process includes forming a concavo-concave pattern at the non-exposure region.

6. The method of claim 5, wherein the concavo-concave shape is a slit shape of the slit mask.

7. The method of claim 6, wherein the edge exposure process includes forming a pattern of a stripe type at the non-exposure region.

8. A method of fabricating an LCD device, comprises:
    preparing a substrate having a plurality of LCD panel regions within main exposure regions and a non-exposure region;
    forming a layer for forming a black matrix on the substrate;
    forming a photoresist film on the layer;
    separately exposing the photoresist film at the LCD regions and the non-exposure region, wherein the photoresist film at the LCD regions is exposed by using a main exposure process, and the photoresist film at the non-exposure region is exposed by using an edge exposure process to form a photoresist pattern;
    patterning the layer by using the photoresist pattern as a mask to form a black matrix and a pattern on the substrate;
    removing the photoresist pattern;
    forming color filter layers and a resin pattern on the substrate, wherein the color filter layers are formed at the LCD regions of the substrate by using a main exposure process, and the resin pattern is formed on the pattern of the non-exposure region by using an edge exposure process;
    forming an overcoat layer on the substrate including the color filter layers and the resin pattern;
    forming a common electrode on the overcoat layer;
    forming a plurality of column spacers on the common electrode; and
    forming an alignment layer over the spacers and common electrode.

9. A method of fabricating an LCD device, comprising:
    preparing a first substrate having a plurality of LCD panel regions within main exposure regions and a non-exposure region;
    preparing a second substrate:
    forming a layer for forming a black matrix on the first substrate;
    forming a photoresist film on the layer; separately exposing the photoresist film at the LCD regions and the non-exposure region, wherein the photoresist film at the LCD regions is exposed by using a main exposure process, and the photoresist film at the non-exposure region is exposed by using an edge exposure process to form a photoresist pattern;
    patterning the layer by using the photoresist pattern as a mask to form a black matrix and a pattern on the first substrate;
    removing the photoresist pattern;
    forming color filter layers and a resin pattern on the first substrate, wherein the color filter layers are formed at the LCD regions of the first substrate by using a main exposure process, and the resin pattern is formed on the pattern of the non-exposure region by using an edge exposure process;

forming a common electrode on the first substrate including the color filter layers and the resin pattern;

forming a plurality of column spacers on the common electrode;

forming an alignment layer over the spacers and common electrode;

forming a metal layer on the second substrate;

forming a photoresist layer on the metal layer;

performing a main exposure process on the photoresist layer to define a non-exposure region of the photoresist layer between the main exposure regions;

performing an edge exposure process at the non-exposure region of the photoresist layer using an edge exposing device where a mask having a predetermined pattern is etching the metal layer by using the photoresist layer to form a gate electrode and to form a patterned metal layer in the non-exposure region;

forming an active layer on the gate electrode;

forming source and drain electrodes on the active layer;

forming a passivation layer on the source and drain electrodes;

forming a pixel electrode on the passivation layer;

forming liquid crystal between the first and second substrates; and attaching the first and second substrates to each other.

10. The method of claim 9, wherein the edge exposure process is performed by an edge exposing device having a mask.

11. The method of claim 10, wherein the mask includes a plurality of slits.

12. The method of claim 10, wherein the edge exposure process includes forming a photoresist pattern of a mask pattern at the non-exposure region.

13. The method of claim 12, wherein the mask pattern is shaped as a stripe.

* * * * *